(12) United States Patent
Lee

(10) Patent No.: US 10,406,881 B2
(45) Date of Patent: Sep. 10, 2019

(54) VARIABLE DAMPING FORCE SHOCK ABSORBER

(71) Applicant: MANDO CORPORATION, Pyeongtaek-si, Gyeonggi-do (KR)

(72) Inventor: Kwang Su Lee, Suwon-si (KR)

(73) Assignee: MANDO CORPORATION, Pyeongtak-si, Gyeonggi-Do (KR)

( * ) Notice: Subject to any disclaimer, the term of this patent is extended or adjusted under 35 U.S.C. 154(b) by 60 days.

(21) Appl. No.: 15/906,544

(22) Filed: Feb. 27, 2018

(65) Prior Publication Data
US 2018/0244122 A1 Aug. 30, 2018

(30) Foreign Application Priority Data
Feb. 27, 2017 (KR) .......... 10-2017-0025499

(51) Int. Cl.
| | |
|---|---|
| B60G 15/06 | (2006.01) |
| B60G 13/08 | (2006.01) |
| B60G 17/08 | (2006.01) |
| F16F 9/18 | (2006.01) |
| F16F 9/50 | (2006.01) |
| F16F 13/00 | (2006.01) |
| F16F 9/46 | (2006.01) |

(52) U.S. Cl.
CPC .......... *B60G 15/061* (2013.01); *B60G 13/08* (2013.01); *B60G 17/08* (2013.01); *F16F 9/185* (2013.01); *F16F 9/463* (2013.01); *F16F 9/50* (2013.01); *F16F 13/007* (2013.01); *B60G 2202/24* (2013.01); *B60G 2202/30* (2013.01); *B60G 2500/10* (2013.01); *B60G 2600/18* (2013.01); *B60G 2800/162* (2013.01); *F16F 2228/066* (2013.01); *F16F 2230/18* (2013.01)

(58) Field of Classification Search
CPC ...... B60G 15/061; B60G 17/08; B60G 13/08; B60G 2600/18; B60G 2202/30; B60G 2500/10; B60G 2800/162; F16F 13/007; F16F 9/185; F16F 9/50; F16F 2228/066; F16F 2230/18
See application file for complete search history.

(56) References Cited

U.S. PATENT DOCUMENTS

| | | | | |
|---|---|---|---|---|
| 4,527,676 A | * | 7/1985 | Emura ............... | F16F 9/462 188/266.4 |
| 4,984,819 A | * | 1/1991 | Kakizaki ........... | B60G 17/0152 188/266.7 |
| 5,054,809 A | * | 10/1991 | Yamaoka ........... | B60G 17/018 188/266.7 |
| 2011/0202236 A1 | * | 8/2011 | Galasso .............. | B62K 25/04 701/37 |

* cited by examiner

*Primary Examiner* — Xuan Lan Nguyen
(74) *Attorney, Agent, or Firm* — Morgan, Lewis & Bockius LLP

(57) ABSTRACT

The present exemplary embodiments relate to a variable damping force shock absorber in which variable valves each capable of varying a damping force during compression and rebound strokes are installed inside a cylinder, and thus, a volume of an apparatus is reduced to easily secure an installation space and prevent interference with peripheral components.

10 Claims, 3 Drawing Sheets

VARIABLE DAMPING FORCE SHOCK ABSORBER

CROSS-REFERENCE TO RELATED APPLICATION

This application claims priority to and the benefit of Korean Patent Application No. 10-2017-0025499, filed on Feb. 27, 2017, the disclosure of which is incorporated herein by reference in its entirety.

BACKGROUND

1. Field of the Invention

The present exemplary embodiments relate to a variable damping force shock absorber, and more particularly, to a variable damping force shock absorber in which variable valves each capable of varying a damping force during compression and rebound strokes are installed inside a cylinder, and thus, a volume of an apparatus is reduced to easily secure an installation space and prevent interference with peripheral components.

2. Discussion of Related Art

Generally, a shock absorber is installed in a transportation means such as a vehicle and improves ride comport by absorbing and buffering a vibration, a shock, or the like applied from a road surface during driving.

The shock absorber includes a piston rod installed inside a cylinder to perform compression and rebound strokes and a piston valve located inside the cylinder to generate a damping force while connected to the piston rod.

However, the shock absorber is characterized by, when a damping force is set to a low level, a vibration caused by an unevenness of a road surface is absorbed to improve ride comport, and when the damping force is set to a high level, a change in the positioning of a vehicle body is suppressed to improve handling stability.

Therefore, variable damping force shock absorbers having damping force characteristics differently set according to a vehicle's purpose of use, have been applied to existing vehicles.

The above-described existing variable damping force shock absorber may be configured such that a spool of a solenoid closes an auxiliary channel to generate a high damping force (hard mode) and, inversely, opens the auxiliary channel to generate a low damping force (soft mode).

In order to independently control a damping force during compression and rebound strokes of a vehicle, a configuration in which a compression-side variable valve and a rebound-side variable valve are installed outside a cylinder has been used.

In the existing variable damping force shock absorber, a variable valve protrudes to the outside of a cylinder to make an apparatus bulky, and thus, an installation space may be difficult to secure and interference may occur between the variable valve and peripheral components.

SUMMARY OF THE INVENTION

The present exemplary embodiments are directed to provide a variable damping force shock absorber in which variable valves each capable of varying a damping force during compression and rebound strokes and an extensible and contractible wire for supplying a current are installed inside a cylinder, and thus, a volume of an apparatus is reduced to easily secure an installation space and prevent interference with peripheral components.

According to an aspect of the present invention, there is provided a variable damping force shock absorber which includes an inner tube and an outer tube filled with a fluid and a piston rod configured to perform compression and rebound strokes in the inner tube, the variable damping force shock absorber including an upper variable valve coupled to a lower end of the piston rod and configured to divide an interior of the inner tube into a compression chamber and a rebound chamber and switch between a soft mode and a hard mode by adjusting a sectional area of a channel through a movement of a first spool during the rebound stroke; a lower variable valve configured to separate the compression chamber and a storage chamber between the inner tube and the outer tube and switch between the soft mode and the hard mode by adjusting a sectional area of a channel through a movement of a second spool during the compression stroke; and a wire disposed between the upper variable valve and the lower variable valve so as to be vertically extensible and contractible and configured to electrically connect the lower variable valve and the upper variable valve.

The upper variable valve may include a piston configured to divide the interior of the inner tube into the compression chamber and the rebound chamber and having a main chamber formed to vertically pass therethrough; a first retainer coupled to a lower surface of the piston and having a connection channel formed to vertically pass therethrough so as to be connected to the main channel; a first housing disposed on a lower surface of the first retainer to form a back pressure chamber on an upper surface thereof and having a back pressure channel formed to vertically pass therethrough such that the back pressure chamber and the compression chamber communicate with each other; a first pilot valve configured to generate a damping force by being in close contact with the connection channel between the first retainer and the first housing; a first upper check valve coupled to an upper surface of the piston so as to be opened and closed and configured to generate a damping force while moving a fluid of the compression chamber moved through the main channel to the rebound chamber during the compression stroke; a first lower check valve coupled to a lower surface of the first housing so as to be opened and closed and configured to generate a damping force while moving a fluid moved through the back pressure channel to the compression chamber during the rebound stroke; a first spool guide coupled to penetrate the first retainer, the first housing, the first pilot valve, the first upper check valve, and the first lower check valve to guide the first spool while surrounding an exterior of the first spool, and having a bypass channel formed to be opened by a movement of the first spool during a stroke in the soft mode; and a first solenoid coupled to an upper end of the piston to move the first spool to a location of the hard mode or the soft mode, electrically connected to an external power supply through the piston rod, and having a lower end electrically connected to an upper end of the wire.

A plug may be further coupled to a lower end of the first spool guide, and a first through-hole may be further formed in the plug and the first spool such that the upper end of the wire is coupled to vertically pass therethrough to be electrically connected to the first solenoid.

At least one sealing member may be coupled to an inner peripheral surface of the first through-hole to be in close contact with a side surface of the wire.

The lower variable valve may include a valve body installed at a lower end of the compression chamber and configured to separate the compression chamber and the storage chamber, a lower channel being formed to vertically pass through the valve body; a second retainer coupled to a lower surface of the valve body, the lower channel being formed to vertically pass through the second retainer; a second housing disposed on a lower surface of the second retainer to form a back pressure chamber on an upper surface thereof and having a back pressure channel formed to vertically pass therethrough; a second pilot valve configured to generate a main damping force by being in close contact with the connection channel between the second retainer and the second housing; a second upper check valve coupled to an upper surface of the valve body so as to be opened and closed and configured to generate a damping force while moving a fluid of the storage chamber moved through the lower channel to the compression chamber during the rebound stroke; a second lower check valve coupled to a lower surface of the second housing so as to be opened and closed and configured to generate a damping force while moving a fluid moved through the back pressure channel to the storage chamber during the compression stroke; a second spool guide coupled to penetrate the second retainer, the second housing, the second pilot valve, the second upper check valve, and the second lower check valve to guide the second spool while surrounding an exterior of the second spool, and having a bypass channel formed to be opened by a movement of the second spool during a stroke in the soft mode; and a second solenoid coupled to an upper end of the valve body to move the second spool to a location of the hard mode or the soft mode, and electrically connected to a lower end of the wire.

The wire may extend in a coil spring form in a vertical direction thereof to be vertically extensible and contractible.

The wire may have an upper coupling end extending upward from an upper end of the wire and electrically connected to the first solenoid; a lower coupling end extending downward from a lower end of the wire and electrically connected to the second solenoid; and a spiral portion configured to connect the upper coupling end and the lower coupling end and extend in a coil spring form to be vertically extensible and contractible.

The variable damping force shock absorber may further include an upper guide provided at a lower end of the upper variable valve and coupled to the upper coupling end to guide a vertical expansion and contraction movement of the spiral portion; and a lower guide provided at an upper end of the lower variable valve and coupled to the lower coupling end to guide the vertical expansion and contraction movement of the spiral portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments will be described in detail with reference to the accompanying drawings.

The advantages, features, and schemes of achieving the advantages and features of the present exemplary embodiments will be made apparent to and comprehended by those skilled in the art based on the exemplary embodiments, which will be described later in detail, together with accompanying drawings.

The present exemplary embodiments are not limited to the following exemplary embodiments but include various applications and modifications. The present exemplary embodiments will make the disclosure of the present invention complete, and allow those skilled in the art to completely comprehend the scope of the present invention. The present exemplary embodiments are only defined within the scope of accompanying claims.

In addition, details of generally-known technology that make the subject matter of the present exemplary embodiments unclear will be omitted in the following description.

Figure 1:
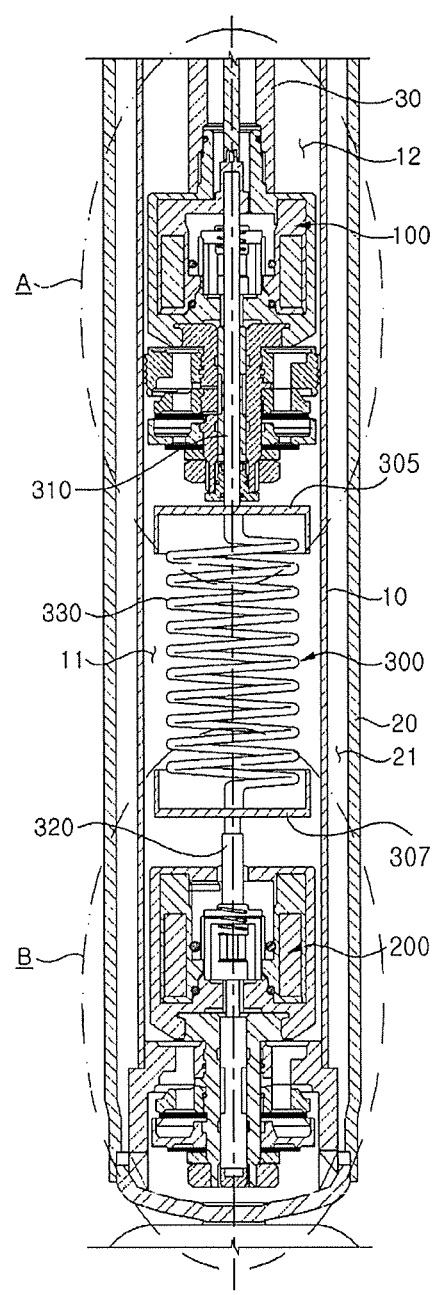
FIG. 1 is a front cross-sectional view illustrating a variable damping force shock absorber according to the present exemplary embodiments.
Figure 2:
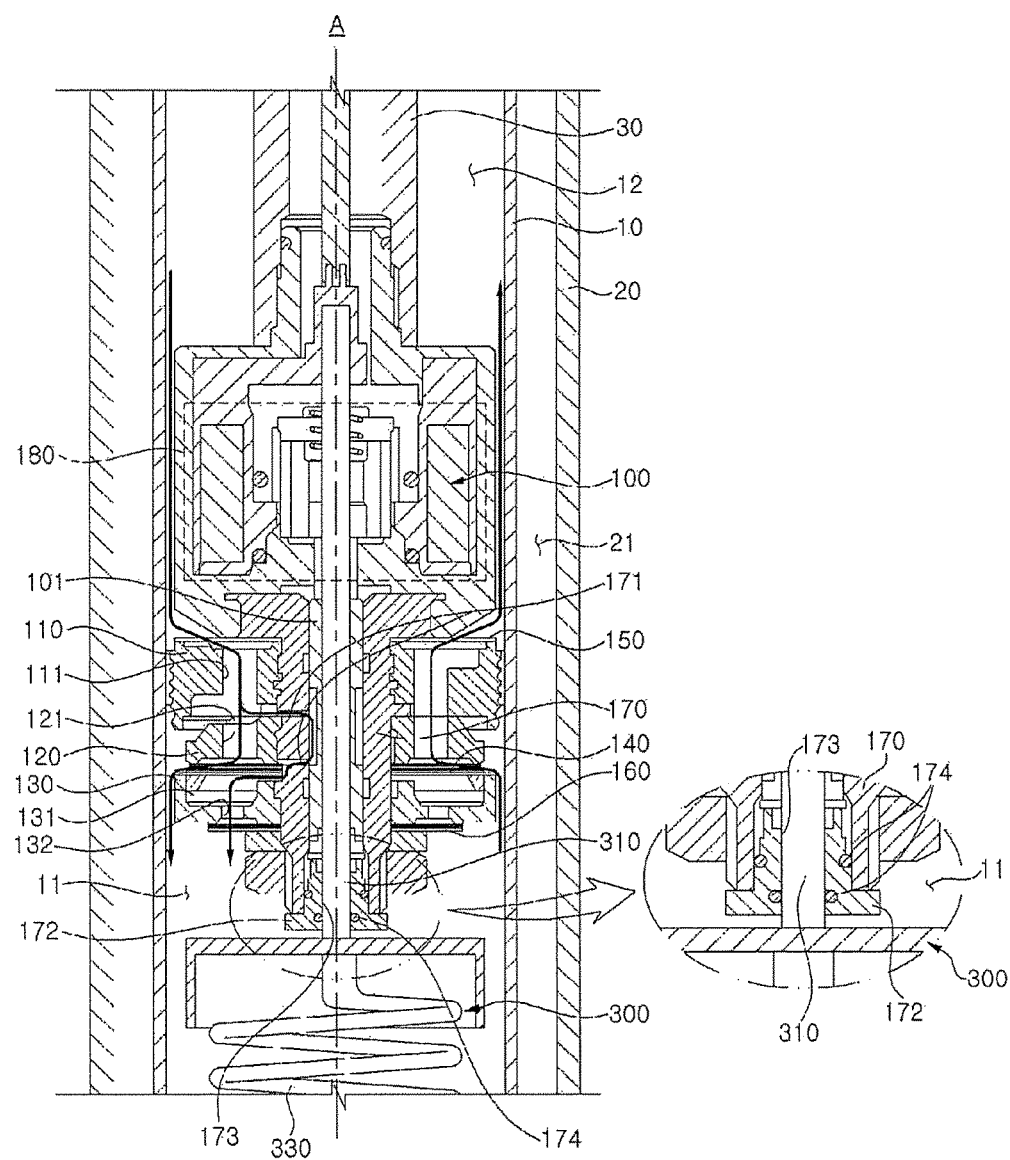
FIG. 2 is an enlarged main portion view illustrating portion A of FIG. 1 in detail.
Figure 3:
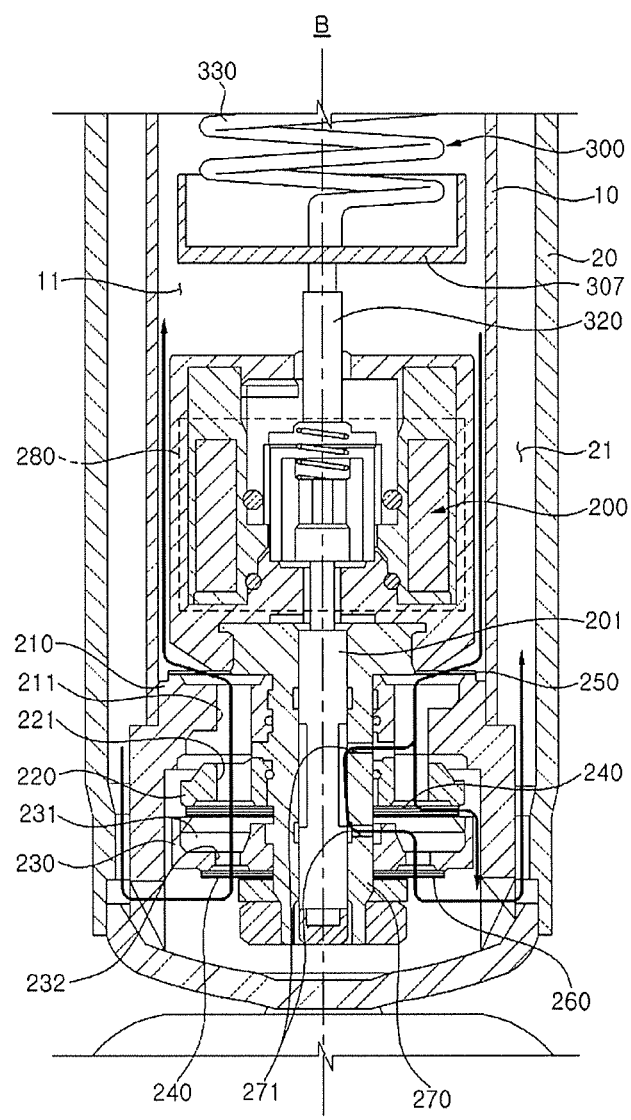
FIG. 3 is an enlarged main portion view illustrating portion B of FIG. 1 in detail.

FIG. 1 is a front cross-sectional view illustrating a variable damping force shock absorber according to the present exemplary embodiments, FIG. 2 is an enlarged main portion view illustrating portion A of FIG. 1 in detail, and FIG. 3 is an enlarged main portion view illustrating portion B of FIG. 1 in detail.

As shown in FIGS. 1 to 3, the variable damping force shock absorber according to the present exemplary embodiments includes a cylinder having an inner tube 10 and an outer tube 20, and a piston rod 30.

In particular, the variable damping force shock absorber according to the present exemplary embodiments includes an upper variable valve 100, a lower variable valve 200, and a wire 300.

Among the above-described elements, the inner tube 10 of the cylinder may have a cylindrical shape forming a space in the cylinder. The inner tube 10 is filled with a fluid (oil or the like).

An interior of the inner tube 10 may be divided into a compression chamber 11 on a lower side thereof and a rebound chamber 12 on an upper side thereof by a piston 110 to be described later.

The outer tube 20 is coupled outside the inner tube 10 and has a diameter larger than a diameter of the inner tube 10. The outer tube 20 may have a shape corresponding to the inner tube 10.

Here, a storage chamber 21 having a certain width is formed between an outer surface of the inner tube 10 and an inner surface of the outer tube 20. The storage chamber 21 is separated from the compression chamber 11 by a valve body 210 to be described later.

Each of one end of the outer tube 20 and one end of the piston rod 30 to be described later may be connected to a vehicle body side or a vehicle wheel side. A separate coupling portion for a connection to the vehicle body side or the vehicle wheel side may be installed at a lower end of the outer tube 20.

That is, when the piston rod 30 performs compression and rebound strokes, the piston rod 30 is moved between the compression chamber 11 and the rebound chamber 12 through the upper variable valve 100 to be described later. A damping force is generated in such a process.

At the same time, a damping force is generated while a fluid of the compression chamber 11 is moved through a lower channel 211 of the valve body 210 to be described later and the storage chamber 21.

One end of the piston rod 30 is coupled to the piston 110 of the upper variable valve 100 to be described later, and the other end thereof opposite to the one end extends outside of the outer tube 20 and is connected to the vehicle body side or the vehicle wheel side of a vehicle.

The upper variable valve 100 is coupled to a lower end of the piston rod 30 and divides the interior of the inner tube 10 into the compression chamber 11 and the rebound chamber 12.

As described above, the upper variable valve 100 generates a damping force using resistance of a fluid while reciprocating inside the inner tube 10.

Here, the upper variable valve 100 switches between a soft mode and a hard mode by adjusting a sectional area of a bypass channel 171 through a movement of a first spool 101 during a rebound stroke.

To this end, as shown in FIG. 2, the upper variable valve 100 may include the piston 110, a first retainer 120, a first housing 130, a first pilot valve 140, a first upper check valve 150, a first lower check valve 160, a first spool guide 170, and a first solenoid 180.

First, the piston 110 is to perform compression and rebound strokes together with the piston rod 30. The piston 110 divides the interior of the inner tube 10 into the compression chamber 11 and the rebound chamber 12.

Here, an outer surface of the piston 110 is moved while in close contact with an inner surface of the inner tube 10. At least one main channel 111 is formed to vertically pass through the piston 110 such that a fluid is vertically moved.

The first retainer 120 is coupled while in close contact with a lower surface of the piston 110. At least one connection channel 121 is formed to vertically pass through the first retainer 120 and communicate with the main channel 111.

The first housing 130 is disposed on a lower surface of the first retainer 120. A back pressure chamber 131 having a certain width is concavely formed on an upper surface of the first housing 130.

At least one back pressure channel 132 is formed to vertically pass through the first housing 130 such that the back pressure chamber 131 and the compression chamber 11 communicate with each other.

The back pressure chamber 131 is disposed on a rear surface of the first pilot valve 140 to be described later and is connected to the main channel 111 during a rebound stroke in a hard mode.

Here, a fluid moved to the back pressure chamber 131 is moved to the compression chamber 11 through the back pressure channel 132 while pushing and opening the first lower check valve 160 to be described later.

An edge of the first pilot valve 140 is in close contact with an edge of the first retainer 120 between the first retainer 120 and the first housing 130.

That is, the first pilot valve 140 is located to block the connection channel 121. The first pilot valve 140 generates a main damping force while the edge thereof is opened during a rebound stroke.

The first upper check valve 150 is coupled to an upper surface of the piston 110 so as to be opened and closed. The first upper check valve 150 generates a damping force while being opened by the pressure of a fluid discharged through an outlet side of the main channel 111 during a compression stroke.

Here, an edge of the first upper check valve 150 is in close contact with an edge of an upper end of the piston 110 and is coupled to block the outlet side of the main channel 111.

At least one slit (not shown) may be formed in the edge of the first upper check valve 150 such that a fluid is moved to the main channel 111 through an inlet side of the main channel 111 during a compression stroke.

The first lower check valve 160 is coupled to a lower surface of the first housing 130 so as to be opened and closed. The first lower check valve 160 generates a damping force while being opened by the pressure of a fluid discharged through an outlet side of the back pressure channel 132 during a rebound stroke.

Here, an edge of the first lower check valve 160 is in close contact with an edge of the first housing 130 and is coupled to block the outlet side of the back pressure channel 132.

As shown in FIG. 2, the first spool guide 170 is to guide the first spool 101. The first spool guide 170 guides the first spool 101 while surrounding an exterior of the first spool 101.

Here, the first spool guide 170 is coupled to penetrate center positions of the first retainer 120, the first housing 130, the first pilot valve 140, the first upper check valve 150, and the first lower check valve 160.

The first spool guide 170 has a guide hole formed therein, in which the first spool 101 is located. The guide hole communicates with the first solenoid 180 to be described later.

In addition, the bypass channel 171 is formed to horizontally pass through the first spool guide 170 so as to be opened by a movement of the first spool 101 during a stroke in a soft mode.

A plurality of bypass channels 171 may be formed in a vertical direction of the first spool guide 170 such that the main channel 111, the guide hole, and the back pressure chamber 131 are connected during a stroke in a soft mode.

Furthermore, a plug 172 may be coupled to a lower end of the first spool guide 170. A first through-hole 173 is formed in the plug 172 and the first spool 101 such that an upper coupling end 310 of the wire 300 to be described later is coupled to vertically penetrate the first through-hole 173.

The first through-hole 173 is formed to have a length in a vertical direction thereof so as to be electrically connected to the first solenoid 180 and extends to the first solenoid 180.

In addition, at least one sealing member 174 is coupled to an inner peripheral surface of the first through-hole 173 to be in close contact with an outer surface of the upper coupling end 310 to be described later.

The sealing member 174 may have a ring shape having a length in a horizontal direction thereof so as to surround an outer peripheral surface of the plug 172.

That is, the sealing member 174 can prevent a fluid or a foreign substance from being introduced through a space between the plug 172 and the guide hole of the first spool guide 170.

The first solenoid 180 is coupled to an upper end of the piston 110 and moves the first spool 101 to a location of a hard mode or a soft mode.

Here, the first solenoid 180 may include a working chamber installed such that a plunger is elevated, and a coil wound outside the working chamber.

The coil may switch the first spool 101 to the soft mode or the hard mode by generating a magnetic force using power supplied from the outside.

Here, the lower variable valve 200 is to separate the compression chamber 11 and the storage chamber 21 between the inner tube 10 and the outer tube 20. The lower variable valve 200 switches between a soft mode and a hard mode by adjusting a sectional area of a channel through a movement of a second spool 201 during a compression stroke.

To this end, the lower variable valve 200 may include the valve body 210, a second retainer 220, a second housing 230, a second pilot valve 240, a second upper check valve 250, a second lower check valve 260, a second spool guide 270, and a second solenoid 280.

First, the valve body 210 is installed at a lower end of the compression chamber 11 and separates the compression chamber 11 and the storage chamber 21. The lower channel 211 is formed to vertically pass through the valve body 210.

The second retainer 220 is coupled to a lower surface of the valve body 210, and the lower channel 211 is formed to vertically pass through the second retainer 220.

The second housing 230 is disposed on a lower surface of the second retainer 220. A back pressure chamber 231 is concavely formed on an upper surface of the second housing 230.

Here, a back pressure channel 232 is formed to vertically pass through the second housing 230 to connect the back pressure chamber 231 with the compression chamber 11.

An edge of the second pilot valve 240 is in close contact with an edge of the second retainer 220 between the second retainer 220 and the second housing 230.

That is, the second pilot valve 240 is located to block the connection channel 221. The second pilot valve 240 generates a damping force while the edge thereof is opened during a compression stroke.

The second upper check valve 250 is coupled to an upper surface of the valve body 210 so as to be opened and closed. The second upper check valve 250 generates a damping force while moving a fluid of the storage chamber 21 moved through the lower channel 211 to the compression chamber 11 during a rebound stroke.

Here, an edge of the second upper check valve 250 is in close contact with an upper end edge of the valve body 210 to block an outlet side of the lower channel 211.

At least one slit (not shown) may be formed in the edge of the second upper check valve 250 such that a fluid is moved through an inlet side of the lower channel 211 during a compression stroke.

The second lower check valve 260 is coupled to a lower surface of the second housing 230 so as to be opened and closed. The second lower check valve 260 generates a damping force while moving a fluid moved through the back pressure channel 232 to the storage chamber 21 during a compression stroke.

The second spool guide 270 is to guide the second spool 201. The second spool guide 270 guides the second spool 201 while surrounding an exterior of the second spool 201.

As shown in FIG. 3, the second spool guide 270 is coupled to penetrate center positions of the second retainer 220, the second housing 230, the second pilot valve 240, the second upper check valve 250, and the second lower check valve 260.

Here, the second spool guide 270 guides the second spool 201 while surrounding the exterior of the second spool 201. A bypass channel 271 is formed to horizontally pass through the second spool guide 270 so as to be opened by a movement of the second spool 201 during a stroke in a soft mode.

A plurality of bypass channels 271 may be formed in a vertical direction of the second spool guide 270 such that the lower channel 211, the connection channel 221, a guide hole, and the back pressure channel 232 are connected to one another during a stroke in the soft mode.

The second spool guide 270 has the guide hole formed therein, in which the second spool 201 is located. The guide hole communicates with the second solenoid 280 to be described later.

The second solenoid 280 is coupled to an upper end of the valve body 210, moves the second spool 201 to a location of a hard mode or a soft mode, and is electrically connected to the above-described first solenoid 180 by the wire 300 to be described later.

As described above, the second solenoid 280 is coupled to the upper end of the valve body 210 and moves the second spool 201 to the location of the hard mode or the soft mode.

Here, the second solenoid 280 may include a working chamber installed such that a plunger is elevated, and a coil wound outside the working chamber.

The coil may switch the second spool 201 to the soft mode or the hard mode by generating a magnetic force using power supplied from the wire 300 to be described later.

The wire 300 is installed to be vertically extensible and contractible between the upper variable valve 100 and the lower variable valve 200 and electrically connects the upper variable valve 100 with the lower variable valve 200.

Here, it is desirable that the wire 300 extends in a coil spring form in a vertical direction thereof to be vertically extensible and contractible.

More specifically, as shown in FIG. 3, the wire 300 may have the upper coupling end 310, a lower coupling end 320, and a spiral portion 330.

The upper coupling end 310 extends upward from an upper end of the wire 300. The upper coupling end 310 is inserted into the above-described first through-hole 173 and is electrically connected to the first solenoid 180.

The lower coupling end 320 extends downward from a lower end of the wire 300. The lower coupling end 320 is electrically connected to the second solenoid 280.

The spiral portion 330 connects the upper coupling end 310 and the lower coupling end 320. It is desirable that the spiral portion 330 extends in a coil spring form in a vertical direction thereof to be vertically extensible and contractible.

That is, since a length of the spiral portion 330 is vertically extensible and contractible, the length of the spiral portion 330 can be easily adjusted when the upper variable valve 100 is vertically moved.

In addition, an upper guide 305 may be provided at a lower end of the upper variable valve 100. The upper guide 305 is coupled to the upper coupling end 310 to guide a vertical expansion and contraction movement of the spiral portion 330 and prevent a collision between the spiral portion 330 and the upper variable valve 100.

A lower guide 307 may be provided at an upper end of the lower variable valve 200. The lower guide 307 is coupled to the lower coupling end 320 to guide the vertical expansion and contraction movement of the spiral portion 330 and prevent a collision between the spiral portion 330 and the lower variable valve 200.

Here, the upper guide 305 and the lower guide 307 are formed in cylindrical shapes which are closed in directions toward the upper variable valve 100 and the lower variable valve 200, respectively. A diameter of each of the upper guide 305 and the lower guide 307 is larger than a diameter of an outermost portion of the spiral portion 330 of the wire 300.

Hereinafter, operation of the variable damping force shock absorber according to the present exemplary embodiments will be described with reference to FIGS. 2 and 3.

First, when the first solenoid 180 is operated in a hard mode and then a rebound stroke is performed, as shown in FIG. 2, a fluid of the rebound chamber 12 is moved along the main channel 111 of the piston 110 and the connection channel 121 of the first retainer 120.

In this case, the fluid moved along the connection channel 121 is moved while pushing and opening the first pilot valve 140, and a damping force is generated in such a process.

At the same time, the fluid moved along the main channel 111 flows into the back pressure chamber 131 through the bypass channel 171 and the guide hole of the first spool guide 170.

After that, the fluid flowing into the back pressure chamber 131 is moved to the compression chamber 11 through the back pressure channel 132 while pushing and opening the first lower check valve 160, and an additional damping force is generated in such a process.

However, when the second solenoid 280 is operated in the hard mode and then the rebound stroke is performed, as shown in FIG. 3, a fluid of the compression chamber 11 is moved along the lower channel 211 of the valve body 210 and the connection channel 221 of the second retainer 220.

In this case, the fluid moved along the connection channel 221 is moved to the compression chamber 11 while pushing and opening the second pilot valve 240, and a damping force is generated in such a process.

At the same time, the fluid moved along the lower channel 211 flows into the back pressure chamber 231 through the bypass channel 271 and the guide hole of the second spool guide 270.

After that, the fluid flowing into the back pressure chamber 231 is moved to the storage chamber 21 through the back pressure channel 232 while pushing and opening the second lower check valve 260, and an additional damping force is generated in such a process.

As a result, according to the present exemplary embodiments, the upper variable valve 100 and the lower variable valve 200 each capable of varying a damping force during compression and rebound strokes can be disposed inside the cylinder, and a current can be supplied to the lower variable valve 200 using the wire 300 that is extensible and contractible.

Therefore, according to the present exemplary embodiments, a volume of an apparatus can be reduced to easily secure an installation space and prevent interference with peripheral components.

According to the exemplary embodiments, variable valves each capable of varying a damping force during compression and rebound strokes and an extensible and contractible wire for supplying a current can be installed inside a cylinder, and thus, a volume of an apparatus can be reduced to easily secure an installation space and prevent interference with peripheral components.

Although exemplary embodiments of the variable damping force shock absorber have been described, it is apparent that various modifications can be made to the disclosed exemplary embodiments without departing from the scope of the present exemplary embodiments.

Thus, the scope of the present exemplary embodiments should not be limited to the disclosed exemplary embodiments, and should be defined by features of the following claims and equivalent features thereof.

That is, it should be construed that the disclosed exemplary embodiments are merely exemplary examples in all aspects and the scope of the present exemplary embodiments is defined by the following claims, rather than the detailed description, and all changes and modifications derived from the meaning, scope, and equivalent concepts of the claims are included in the scope of the present exemplary embodiments.

What is claimed is:

1. A variable damping force shock absorber which comprises an inner tube an outer tube filled with a fluid and a piston rod configured to perform compression and rebound strokes in the inner tube, the variable damping force shock absorber comprising:
   an upper variable valve coupled to a lower end of the piston rod and configured to divide an interior of the inner tube into a compression chamber and a rebound chamber and switch between a soft mode and a hard mode by adjusting a sectional area of a channel through a movement of a first spool during the rebound stroke;
   a lower variable valve configured to separate the compression chamber and a storage chamber between the inner tube and the outer tube and switch between the soft mode and the hard mode by adjusting a sectional area of a channel through a movement of a second spool during the compression stroke; and
   a wire disposed between the upper variable valve and the lower variable valve to be vertically extensible and contractible and configured to electrically connect the lower variable valve and the upper variable valve.

2. The variable damping force shock absorber of claim 1, wherein the upper variable valve comprises:
   a piston configured to divide the interior of the inner tube into the compression chamber and the rebound chamber and having a main chamber formed to vertically pass therethrough;
   a first retainer coupled to a lower surface of the piston and having a connection channel formed to vertically pass therethrough so as to be connected to the main channel;
   a first housing disposed on a lower surface of the first retainer to form a back pressure chamber on an upper surface thereof and having a back pressure channel formed to vertically pass therethrough such that the back pressure chamber and the compression chamber communicate with each other;
   a first pilot valve configured to generate a damping force by being in close contact with the connection channel between the first retainer and the first housing;
   a first upper check valve coupled to an upper surface of the piston so as to be opened and closed and configured to generate a damping force while moving a fluid of the compression chamber moved through the main channel to the rebound chamber during the compression stroke;
   a first lower check valve coupled to a lower surface of the first housing so as to be opened and closed and configured to generate a damping force while moving a fluid moved through the back pressure channel to the compression chamber during the rebound stroke;
   a first spool guide coupled to penetrate the first retainer, the first housing, the first pilot valve, the first upper check valve, and the first lower check valve to guide the first spool while surrounding an exterior of the first spool, and having a bypass channel formed to be opened by a movement of the first spool during a stroke in the soft mode; and
   a first solenoid coupled to an upper end of the piston to move the first spool to a location of the hard mode or the soft mode, electrically connected to an external power supply through the piston rod, and having a lower end electrically connected to an upper end of the wire.

3. The variable damping force shock absorber of claim 2, wherein a plug is further coupled to a lower end of the first spool guide, and
- a first through-hole is further formed in the plug and the first spool such that the upper end of the wire is coupled to vertically pass therethrough to be electrically connected to the first solenoid.

4. The variable damping force shock absorber of claim 3, wherein at least one sealing member is coupled to an inner peripheral surface of the first through-hole to be in close contact with a side surface of the wire.

5. The variable damping force shock absorber of claim 1, wherein the lower variable valve comprises:
- a valve body installed at a lower end of the compression chamber and configured to separate the compression chamber and the storage chamber, a lower channel being formed to vertically pass through the valve body;
- a second retainer coupled to a lower surface of the valve body, the lower channel being formed to vertically pass through the second retainer;
- a second housing disposed on a lower surface of the second retainer to form a back pressure chamber on an upper surface thereof and having a back pressure channel formed to vertically pass therethrough;
- a second pilot valve configured to generate a main damping force by being in close contact with the connection channel between the second retainer and the second housing;
- a second upper check valve coupled to an upper surface of the valve body so as to be opened and closed and configured to generate a damping force while moving a fluid of the storage chamber moved through the lower channel to the compression chamber during the rebound stroke;
- a second lower check valve coupled to a lower surface of the second housing so as to be opened and closed and configured to generate a damping force while moving a fluid moved through the back pressure channel to the storage chamber during the compression stroke;
- a second spool guide coupled to penetrate the second retainer, the second housing, the second pilot valve, the second upper check valve, and the second lower check valve to guide the second spool while surrounding an exterior of the second spool, and having a bypass channel formed to be opened by a movement of the second spool during a stroke in the soft mode; and
- a second solenoid coupled to an upper end of the valve body to move the second spool to a location of the hard mode or the soft mode, and electrically connected to a lower end of the wire.

6. The variable damping force shock absorber of claim 1, wherein the wire extends in a coil spring form in a vertical direction thereof to be vertically extensible and contractible.

7. The variable damping force shock absorber of claim 1, wherein the wire has an upper coupling end extending upward from an upper end of the wire and electrically connected to the first solenoid;
- a lower coupling end extending downward from a lower end of the wire and electrically connected to the second solenoid; and
- a spiral portion configured to connect the upper coupling end and the lower coupling end and extend in a coil spring form to be vertically extensible and contractible.

8. The variable damping force shock absorber of claim 7, further comprising:
- an upper guide provided at a lower end of the upper variable valve and coupled to the upper coupling end to guide a vertical expansion and contraction movement of the spiral portion; and
- a lower guide provided at an upper end of the lower variable valve and coupled to the lower coupling end to guide the vertical expansion and contraction movement of the spiral portion.

9. The variable damping force shock absorber of claim 8, wherein the upper guide and the lower guide are formed in cylindrical shapes which are closed in directions toward the upper variable valve and the lower variable valve, respectively.

10. The variable damping force shock absorber of claim 9, wherein a diameter of each of the upper guide and the lower guide is larger than a diameter of an outermost portion of the spiral portion of the wire.

* * * * *